(12) United States Patent
Maurer (10) Patent No.: US 12,448,229 B2
(45) Date of Patent: Oct. 21, 2025

(54) FLOW REGULATING CONVEYANCE APPARATUS, SYSTEM AND METHOD

(71) Applicant: Stolle Machinery Company, LLC, Centennial, CO (US)

(72) Inventor: Joseph John Allen Maurer, Aurora, CO (US)

(73) Assignee: Stolle Machinery Company, LLC, Centennial, CO (US)

( * ) Notice: Subject to any disclaimer, the term of this patent is extended or adjusted under 35 U.S.C. 154(b) by 103 days.

(21) Appl. No.: 18/417,432

(22) Filed: Jan. 19, 2024

(65) Prior Publication Data

US 2025/0236472 A1  Jul. 24, 2025

(51) Int. Cl.
*B65G 51/03* (2006.01)
*B65G 43/08* (2006.01)

(52) U.S. Cl.
CPC ............. *B65G 51/03* (2013.01); *B65G 43/08* (2013.01); *B65G 2201/0252* (2013.01); *B65G 2203/0233* (2013.01); *B65G 2203/0291* (2013.01); *B65G 2203/044* (2013.01)

(58) Field of Classification Search
USPC .......................................................... 406/88
See application file for complete search history.

(56) References Cited

U.S. PATENT DOCUMENTS

| | | | |
|---|---|---|---|
| 4,669,609 A | 6/1987 | Lugo | |
| 5,311,979 A | 5/1994 | Risley et al. | |
| 5,451,125 A * | 9/1995 | Lenhart | B65G 51/03 |
| | | | 406/88 |
| 5,478,174 A * | 12/1995 | Lenhart | B65G 51/03 |
| | | | 406/88 |
| 10,947,066 B2 | 3/2021 | Koga et al. | |
| 11,023,847 B2 | 6/2021 | Skaaksrud | |

FOREIGN PATENT DOCUMENTS

| | | |
|---|---|---|
| DE | 102010050035 A1 | 3/2013 |
| WO | 2022185909 A1 | 9/2022 |
| WO | 2023017304 A1 | 2/2023 |

OTHER PUBLICATIONS

International Searching Authority (ISA), U.S. Patent and Trademark Office, PCTUS24/47725, international Search Report, 2 pages, Dec. 19, 2024.

* cited by examiner

*Primary Examiner* — William R Harp
(74) *Attorney, Agent, or Firm* — Eckert Seamans Cherin & Mellott, LLC (57) ABSTRACT

A flow regulating conveyance system for use in a can manufacturing production line includes: a flow regulating conveyor structured to convey cans along a conveying path and including a platform having a conveyance surface including a plurality of air ports, two track rails transversely-spaced-apart and extending along the conveying path to form a conveying track therebetween, an actuation mechanism structured to adjust the track rails in a transverse direction, and a underlayer disposed below the conveyance surface and structured to block air ports disposed outside of the conveying track; a vision system structured to monitor pack density and can body diameter of cans on the conveying path; and a control system coupled to a conveyance flow actuator, the flow regulating conveyor and the vision system, the control system being structured to control conveyance flow and width of the conveying track based on the conveyance data.

20 Claims, 10 Drawing Sheets

FLOW REGULATING CONVEYANCE APPARATUS, SYSTEM AND METHOD

FIELD OF THE INVENTION

The disclosed concept relates generally to a conveyance apparatus, system and method, more particularly, to a flow regulating conveyance apparatus, system and method for use in can manufacturing production lines.

BACKGROUND OF THE INVENTION

Figure 1:
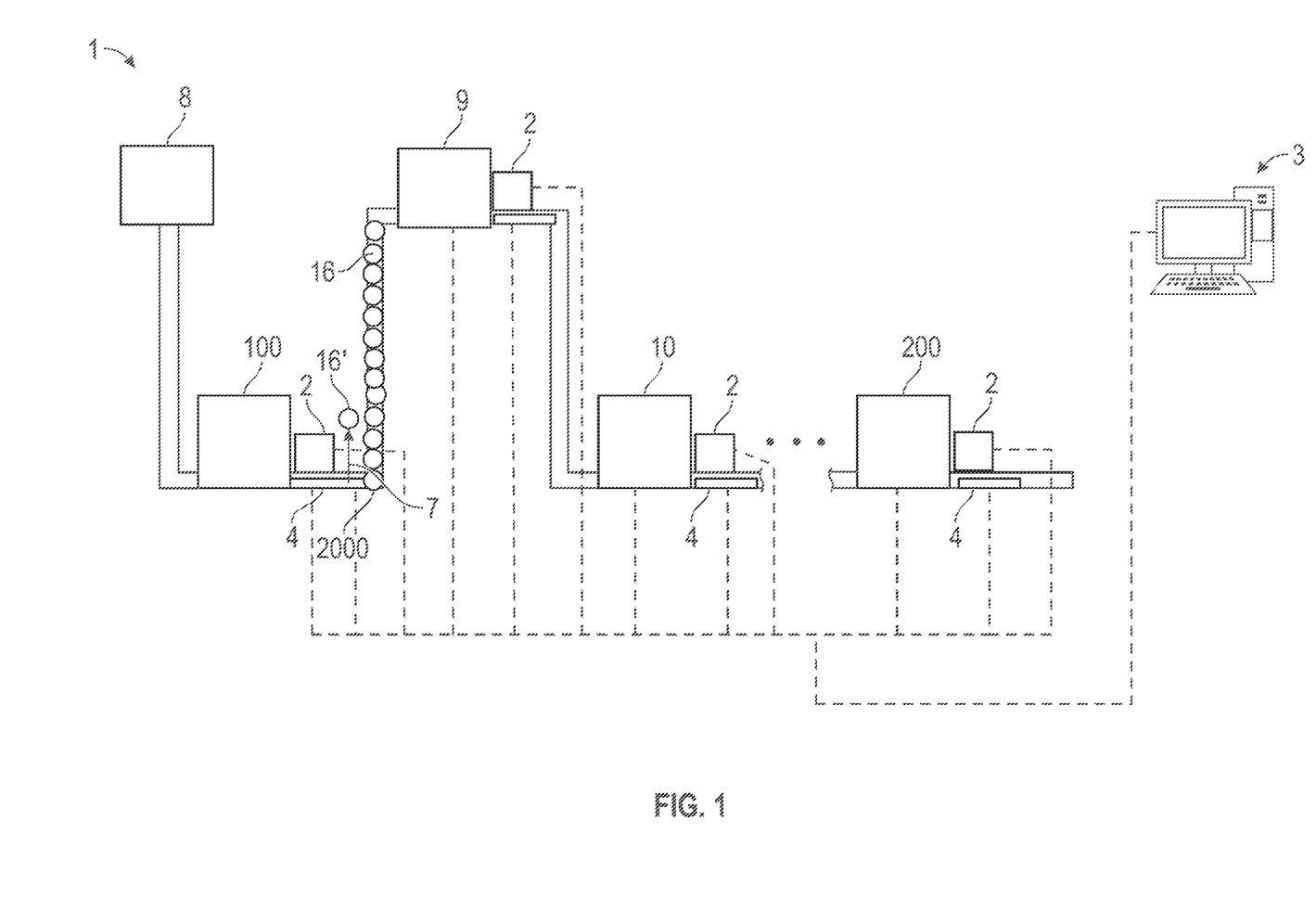
FIG. 1 is an elevation view of an exemplary air conveyance system for use in a can manufacturing production line.
Figure 2:
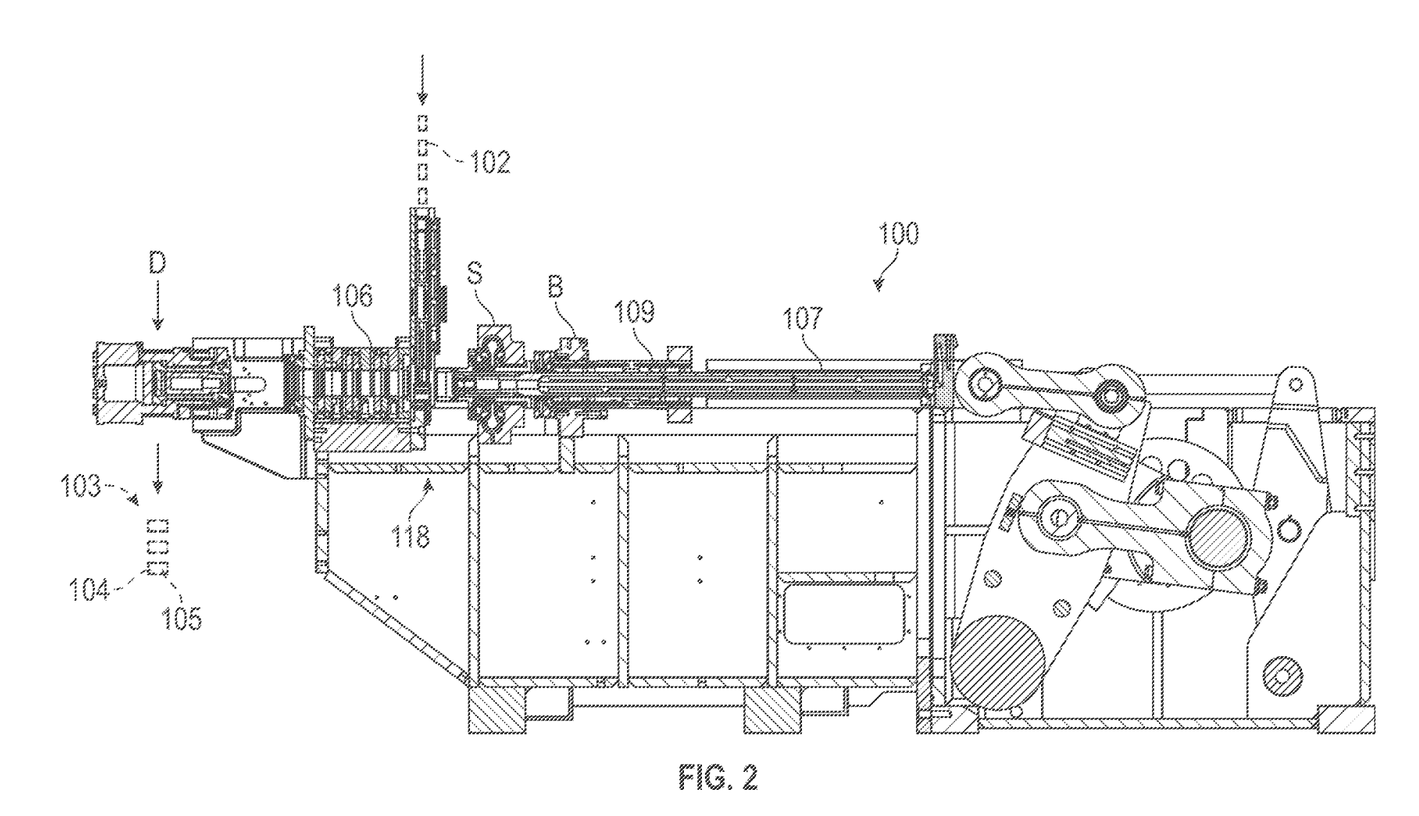
FIG. 2 is an elevation view of an exemplary bodymaker for forming a can body having a base and a can body sidewall.

The process of food and beverage metal packing includes various stages (e.g., without limitation, bodymaking, trimming, washing, printing, necking, flanging, inspecting, filling, etc.) of can manufacturing. FIG. 1 illustrates an example can manufacturing production line 1 including a plurality of machines each performing a different stage or phase of can manufacturing and controlled by a workstation (on-site or externally disposed) 3. In FIG. 1, an aluminum can begins as a disk of aluminum, also known as a "blank," that is punched from a sheet or coil of aluminum by a cupper 8. That is, the sheet is fed into a dual action press where a "blank" disc is cut from the sheet by an outer slide/ram motion. An inner slide/ram then pushes the "blank" through a draw process to create a cup 102 (shown in FIG. 2). The cup 102 has a bottom and a depending sidewall. The cup 102 is fed into a bodymaker 100, one example of which is shown in detail in FIG. 2, which performs a redraw and ironing operation. More specifically, the cup 102 is disposed in a can forming machine at the mouth of a die pack 106 having substantially circular openings therein. The cup 102 is held in place by a redraw sleeve, which is part of the redraw assembly 118. The redraw sleeve is a hollow tubular construct that is disposed inside the cup 102 and biases the cup against the die pack 106. More specifically, the first die in the die pack 106 is the redraw die, which is not a part of the redraw assembly. The cup 102 is biased against the redraw die by the redraw sleeve. Other dies, the ironing dies, are disposed behind, and axially aligned with, the redraw die. The ironing dies and redraw die are not part of the redraw assembly. An elongated, cylindrical ram assembly includes a carriage 107 that supports a ram 109 with a punch at the forward, distal end. The ram 109 and punch are aligned with, and structured to travel through, the openings in the redraw die and the ironing dies. At the end of the die pack 106 opposite the ram is a domer "D". The domer is a die structured to form a concave dome in the bottom of the cup/can. Further, the ram 109 is supported by a bearing "B" disposed before the die pack 106. A seal assembly "S" is disposed between the bearing assembly "B" and the die pack 106. The seal assembly "S" removes coolant and lubricant from the ram.

Thus, in operation, a cup is disposed at one end of the die pack. The cup, typically, has a greater diameter than a finished can as well as a greater wall thickness. The redraw sleeve is disposed inside of the cup and biases the cup bottom against the redraw die. The opening in the redraw die has a diameter that is smaller than the cup. The elongated ram body, and more specifically the punch, passes through the hollow redraw sleeve and contacts the bottom of the cup. As the ram body continues to move forward, the cup is moved through the redraw die. As the opening in the redraw die is smaller than the original diameter of the cup, the cup is deformed and becomes elongated with a smaller diameter. The wall thickness of the cup, typically, remains the same as the cup passes through the redraw die. As the ram continues to move forward, the elongated cup passes through a number of ironing dies. Each ironing die thins the wall thickness of the cup. The final forming of the can body occurs when the bottom of the elongated cup engages the domer, creating a concave dome in the cup bottom. At this point, and compared to the original shape of the cup, the can body 16 is elongated, has a thinner wall, and a domed bottom. This process is repeated as the ram body reciprocates. That is, the ram travels toward, and through, the die pack on a forward stroke, and, travels backwards through the die pack and away from the die pack on a return stroke.

After the forming operations on the can body 16 are complete, the can body 16 is ejected from the ram, and more specifically the punch, for further processing. That is, the can body 16 may be, e.g., without limitation, trimmed by a trimmer 9, decorated by a can decorator 10, and necked by a necker machine 200.

Figure 3:
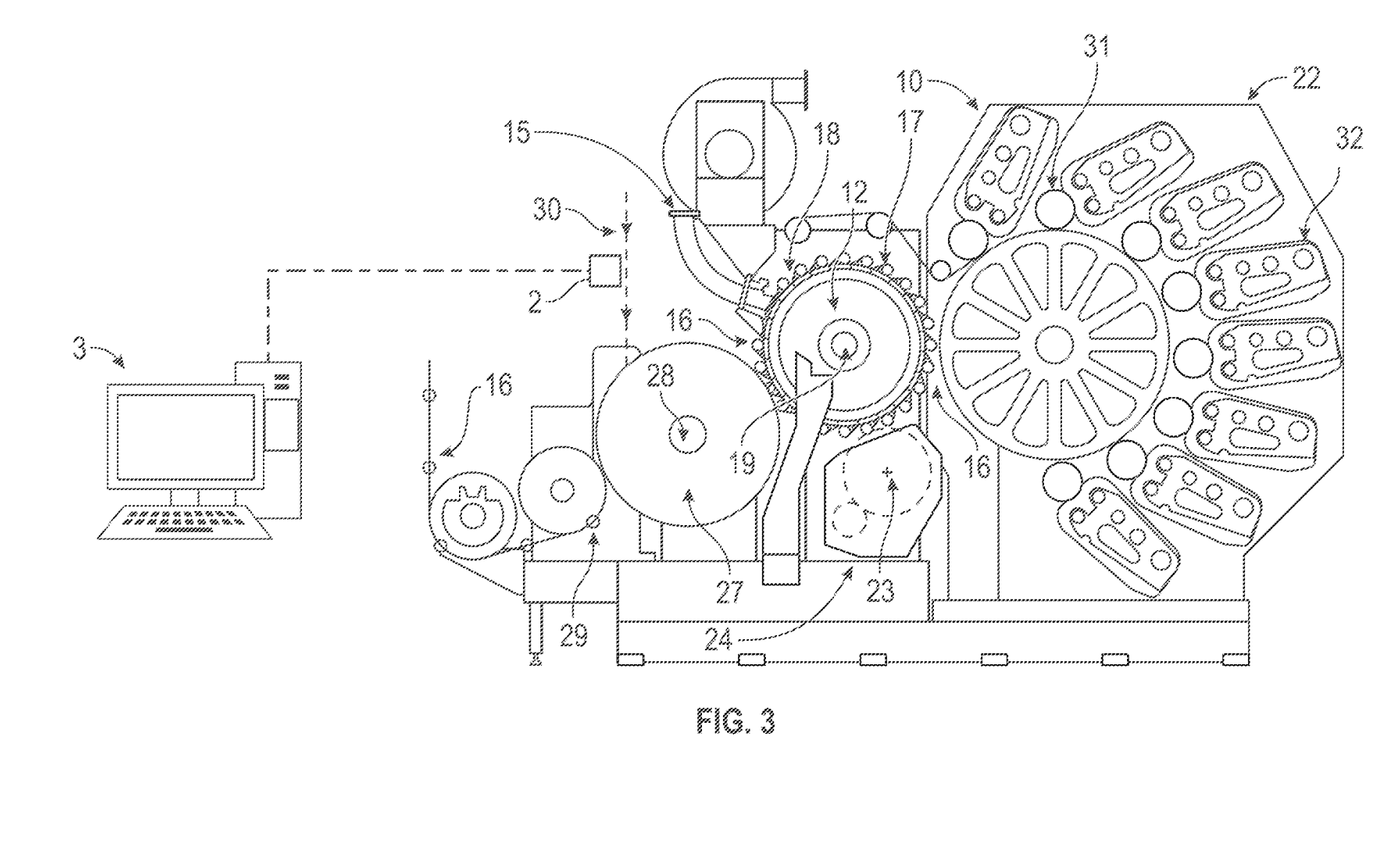
FIG. 3 is an elevation view of an exemplary can decorator for decorating a can body.

An example can decorator 10 is illustrated in FIG. 3. A can decorator 10 is used for decorating cans 16 and may include an infeed conveyor 15, which receives cans 16 from a can supply (not shown) and directs them to arcuate cradles or pockets 17 along the periphery of spaced parallel rings secured to a pocket wheel 12. The pocket wheel 12 is secured to a continuously rotating mandrel carrier wheel 18, which in turn is keyed to a continuously rotating horizontal drive shaft 19. Downstream from the infeed conveyor 15, each spindle or mandrel is in closely spaced axial alignment with an individual pocket 17, and undecorated cans 16 are transferred from the pockets 17 to the mandrels. Suction applied through an axial passage of the mandrel draws the can 16 to a final seated position on the mandrel. While mounted on a mandrel, each can 16 is decorated by being brought into engagement with a blanket (e.g., without limitation, a replaceable adhesive-backed piece of rubber) disposed on a blanket wheel of the multicolor printing unit indicated generally by reference numeral 22. While moving toward engagement with an undecorated can 16, the blanket wheel engages a plurality of plate cylinders 31, each of which is associated with an individual inking station 32 (an exemplary eight inking stations 32 are shown in FIG. 3). Typically, each inking station 32 provides a different color ink and each plate cylinder 31 applies a different ink image segment to the blanket. All of the "ink image" segments combine to produce a "main image" that is structured to be applied to the can body. The "main image" is then transferred to undecorated cans 16 and becomes, as used herein, the "can body applied image." Thereafter, and while still mounted on the mandrels, the outside of each decorated can 16 is coated with a protective film of varnish applied by engagement with the periphery of a varnish applicator roll (not shown) rotating on a shaft 23 in the overvarnish unit indicated generally by reference numeral 24. Cans 16 with decorations and protective coatings thereon are then transferred from the mandrels to suction cups (not shown) mounted adjacent the periphery of a transfer wheel (not shown) rotating on a shaft 28 of a transfer unit 27. From the transfer unit 27 the cans 16 are deposited on generally horizontal pins 29 carried by a chain-type output conveyor 30, which carries the cans 16 through a curing oven (not shown) and then to, e.g., a necker machine 200.

Figure 4:
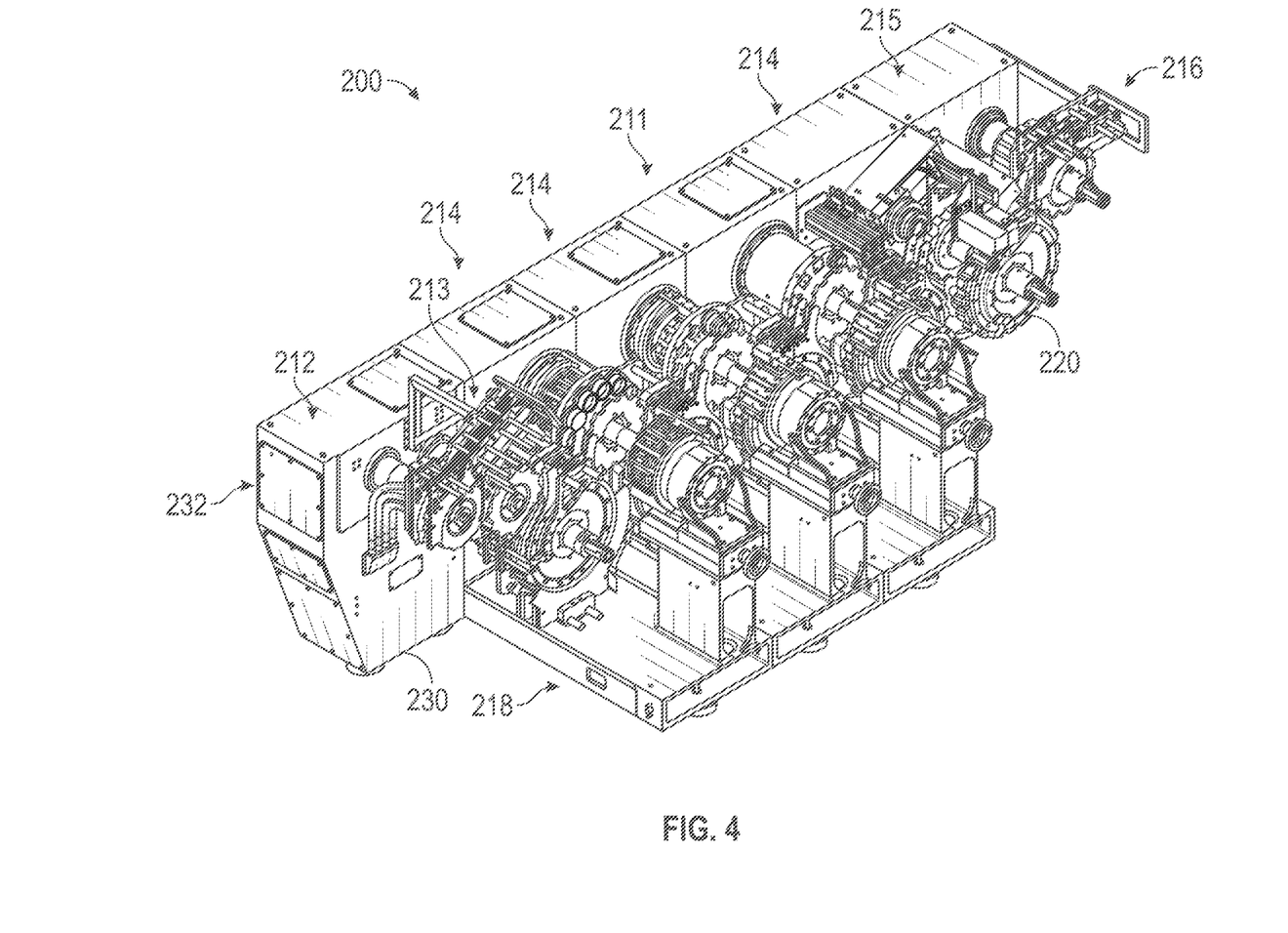
FIG. 4 is a perspective view of an exemplary necker machine for reducing a cross-sectional area of an open end of a can body sidewall.

FIG. 4 illustrates in detail an example of a necker machine 200 which reduces the cross-sectional area of a portion of a can body sidewall, i.e., at the open end of the sidewall. That is, prior to coupling a can end to the can body 16 (and prior to filling), the diameter/radius of the can body sidewall open end is reduced relative to the diameter/radius of other portions of the can body sidewall. The example necker machine 200 generally includes a frame assembly 230 having an upstream end 232 and a downstream end 234 and a plurality of modules 211 (six modules are shown in FIG. 4) coupled together in a side by side arrangement. The plurality of modules 211 includes an infeed module 212 positioned at a first end of the necker machine 200. The infeed module 212 includes an infeed assembly 213 for receiving can bodies. The plurality of modules 211 also includes a plurality of forming/processing modules 214 extending side by side in a series arrangement from the infeed module 212. The plurality of modules 211 concludes with a discharge module 215 positioned at the opposite end of the necker machine 200 from the infeed module 212 such that the plurality of processing modules 214 are bounded by the infeed module 212 and the discharge module 215. The discharge module 215 includes an exit assembly 216 for discharging necked cans from the necker machine 200. The processing and/or forming modules are disposed adjacent to each other and a transfer assembly 218 driven by a drive assembly 220 moves a can body 16 between adjacent processing and/or forming modules. As the can body 16 moves through the processing and/or forming modules 214 the can body is processed or formed. The can bodies 16 may also undergo, e.g., without limitation, flanging, decorating, etc.

During the can manufacturing process, can bodies 16 are inspected for defects, e.g., without limitation, dents in the can bodies, deformed necks or flanges, image defects (e.g., without limitation, skewed, misprinted, or inefficient levels of ink), etc., before being placed on the pallets which are then shipped to a filler. Defective cans 16' may be removed by a removal device 4 communicatively coupled to the work station 3 by, e.g., without limitation, applying air pressure outwardly and directly at the defective cans 16' as shown by the arrow 7. Alternatively, the defective cans 16' may be manually removed from the production line 1 upon detecting the defects via a vision system 2. At the filler, the cans 16 are taken off of the pallets, filled, have ends placed on them, and then are typically repackaged in various quantities (e.g., six packs, twelve pack or other multi-can cases, etc.) for sale to the consumer.

An air conveyance system 2000 may be utilized to transport the cans 16 or cups from one machine process to another. The air conveyance system 2000 is fixed and supplied with air based on the manufacturing process working at full capacity. However, when machines are stopped or the quantity of cans decreased, such as due to less machines running, the air conveyance system 2000 is still supplied with air based on the manufacturing process working at full capacity. Supplying the air to the air conveyance system 2000 uses power, such as by operation of one or more compressors. A typical can plant air conveyance system 2000 can use over 0.85 KW per meter length of conveyance. An entire can plant fitted with air conveyance can use upwards of 1000 MW of power over a year. Some of this energy is wasted when the air conveyance system 2000 is being fully supplied with air when the corresponding can-making machines are inactive or operating at a reduced level.

Furthermore, when can-making machines are operating at a reduced capacity and the air conveyance system 2000 is supplied with air as if the machines were operating at full capacity, the pack density of cans moved by the air conveyance system 2000 will be reduced. This reduced pack density can cause cans to collide and become damaged. Damaged cans are undesirable and should be discarded. Moreover, damaged cans, if not caught before entering the next processing machine, can cause the machine to jam which could result in the entire line being stopped until the jam is cleared. If a damaged can makes it through the manufacturing process and onto a pallet, a typical procedure is to manually inspect every can on the pallet, which can be 2000 to 4000 cans. This is a very time consuming process and if personnel is not available to do the inspection, the entire pallet of cans may be discarded. As such, can damage is undesirable due to waste from discarding damaged cans, reduced production due to shutting down operations to clear a can jam, and time consumption for inspecting cans.

There is room for improvement in conveyance systems for use in can manufacturing production lines.

There is a need for improved system to reduce can damage during conveyance in the can manufacturing process.

SUMMARY OF THE INVENTION

These needs, and others, are met by a flow regulating conveyance system for use in a can manufacturing production line. The flow regulating conveyance system includes a flow regulating conveyor structured to convey cans along a conveying path through the can manufacturing production line, the flow regulating conveyor including a platform having a conveyance surface including a plurality of air ports, the platform extending along the conveying path, two track rails transversely-spaced-apart and extending along the conveying path to form a conveying track therebetween, an actuation mechanism coupled to the track rails and structured to adjust the track rails in a transverse direction orthogonal to the conveying path in a horizontal plane, and an underlayer disposed below the conveyance surface and attached to respective track rail at side edge thereof, the underlayer being structured to block air ports disposed outside of the conveying track; a vision system structured to monitor at least pack density and can body diameter of cans on the conveying path; and a control system communicatively coupled to a conveyance flow actuator, the flow regulating conveyor and the vision system, the control system being structured to receive conveyance data including the pack density and the can body diameter from the vision system, control conveyance flow and width of the conveying track based on the conveyance data.

Another example embodiment of the disclosed concept provides a flow regulating conveyor. The flow regulating conveyor is structured to convey cans along a conveying path and connected to a vision system and a control system. The flow regulating conveyor includes: a platform having a conveyance surface including a plurality of air ports, the platform extending along the conveying path; two track rails transversely-spaced-apart track rails and extending along the conveying path to form a conveying track therebetween; an actuation mechanism coupled to the track rails and structured to adjust the track rails in a transverse direction orthogonal to the conveying path in a horizontal plane; and an underlayer disposed below the conveyance surface and attached to respective track rail at side edge thereof, the underlayer being structured to block air ports disposed outside of the conveying track. The vision system is structured to monitor at least pack density and can body diameter of cans on the conveying path. The control system is structured to receive conveyance data including the pack density and the can body diameter from the vision system, control conveyance flow and width of the conveying track based on the conveyance data.

Yet another example embodiment of the disclosed concept provides a method of conveyance flow regulating in a can manufacturing production line. The method includes providing a flow regulating conveyance system that comprises: (i) a flow regulating conveyor structured to convey cans along a conveying path through the can manufacturing production line, the flow regulating conveyor including a platform having a conveyance surface including a plurality of air ports, the platform extending along the conveying path, two track rails transversely-spaced-apart and extending along the conveying path to form a conveying track therebetween, an actuation mechanism coupled to the track rails and structured to adjust the track rails in a transverse direction orthogonal to the conveying path in a horizontal plane, and an underlayer disposed below the conveyance surface and attached to respective track rail at side edge thereof, the underlayer being structured to block air ports disposed outside of the conveying track; (ii) a vision system structured to monitor at least pack density and can body diameter of cans on the conveying path; and (iii) a control system communicatively coupled to a conveyance flow actuator, the flow regulating conveyor and the vision system, the control system being structured to receive conveyance data including the pack density and the can body diameter from the vision system, and control conveyance flow and width of the conveying track based on the conveyance data; monitoring, by the vision system, at least pack density and can body diameter of cans on the conveying path; transmitting, by the vision system, conveyance data including the pack density and the can body diameter; receiving, by the control system, the conveyance data from the vision system; and controlling, by the control system, conveyance flow and width of the conveying track based on the conveyance data.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

It will be appreciated that the specific elements illustrated in the figures herein and described in the following specification are simply exemplary embodiments of the disclosed concept, which are provided as non-limiting examples solely for the purpose of illustration. Therefore, specific dimensions, orientations, assembly, number of components used, embodiment configurations and other physical characteristics related to the embodiments disclosed herein are not to be considered limiting on the scope of the disclosed concept.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of "a," "an," and "the" include plural references unless the context clearly dictates otherwise.

As used herein, "structured to [verb]" means that the identified element or assembly has a structure that is shaped, sized, disposed, coupled and/or configured to perform the identified verb. For example, a member that is "structured to move" is movably coupled to another element and includes elements that cause the member to move or the member is otherwise configured to move in response to other elements or assemblies. As such, as used herein, "structured to [verb]" recites structure and not function. Further, as used herein, "structured to [verb]" means that the identified element or assembly is intended to, and is designed to, perform the identified verb. Thus, an element that is merely capable of performing the identified verb but which is not intended to, and is not designed to, perform the identified verb is not "structured to [verb]."

As used herein, "associated" means that the elements are part of the same assembly and/or operate together or act upon/with each other in some manner. For example, an automobile has four tires and four hub caps. While all the elements are coupled as part of the automobile, it is understood that each hubcap is "associated" with a specific tire.

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. As used herein, "adjustably fixed" means that two components are coupled so as to move as one while maintaining a constant general orientation or position relative to each other while being able to move in a limited range or about a single axis. For example, a doorknob is "adjustably fixed" to a door in that the doorknob is rotatable, but generally the doorknob remains in a single position relative to the door. Further, a cartridge (nib and ink reservoir) in a retractable pen is "adjustably fixed" relative to the housing in that the cartridge moves between a retracted and extended position, but generally maintains its orientation relative to the housing. Accordingly, when two elements are coupled, all portions of those elements are coupled. A description, however, of a specific portion of a first element being coupled to a second element, e.g., an axle first end being coupled to a first wheel, means that the specific portion of the first element is disposed closer to the second element than the other portions thereof. Further, an object resting on another object held in place only by gravity is not "coupled" to the lower object unless the upper object is otherwise maintained substantially in place. That is, for example, a book on a table is not coupled thereto, but a book glued to a table is coupled thereto.

As used herein, the statement that two or more parts or components "engage" one another means that the elements exert a force or bias against one another either directly or through one or more intermediate elements or components. Further, as used herein with regard to moving parts, a moving part may "engage" another element during the motion from one position to another and/or may "engage" another element once in the described position. Thus, it is understood that the statements, "when element A moves to element A first position, element A engages element B," and "when element A is in element A first position, element A engages element B" are equivalent statements and mean that element A either engages element B while moving to element A first position and/or element A either engages element B while in element A first position.

As used herein, "correspond" indicates that two structural components are sized and shaped to be similar to each other and may be coupled with a minimum amount of friction. Thus, an opening which "corresponds" to a member is sized slightly larger than the member so that the member may pass through the opening with a minimum amount of friction. This definition is modified if the two components are to fit "snugly" together. In that situation, the difference between the size of the components is even smaller whereby the amount of friction increases. If the element defining the opening and/or the component inserted into the opening are made from a deformable or compressible material, the opening may even be slightly smaller than the component being inserted into the opening. With regard to surfaces, shapes, and lines, two, or more, "corresponding" surfaces, shapes, or lines have generally the same size, shape, and contours.

As used herein, the term "number" shall mean one or an integer greater than one (i.e., a plurality). That is, for example, the phrase "a number of elements" means one element or a plurality of elements. It is specifically noted that the term "a 'number' of [X]" includes a single [X].

As used herein, "about" in a phrase such as "disposed about [an element, point or axis]" or "extend about [an element, point or axis]" or "[X] degrees about an [an element, point or axis]," means encircle, extend around, or measured around. When used in reference to a measurement or in a similar manner, "about" means "approximately," i.e., in an approximate range relevant to the measurement as would be understood by one of ordinary skill in the art.

As used herein, an "elongated" element inherently includes a longitudinal axis and/or longitudinal line extending in the direction of the elongation.

As used herein, "generally" means "in a general manner" relevant to the term being modified as would be understood by one of ordinary skill in the art.

As used herein, "substantially" means "for the most part" relevant to the term being modified as would be understood by one of ordinary skill in the art.

As used herein, "at" means on and/or near relevant to the term being modified as would be understood by one of ordinary skill in the art.

Figure 5:
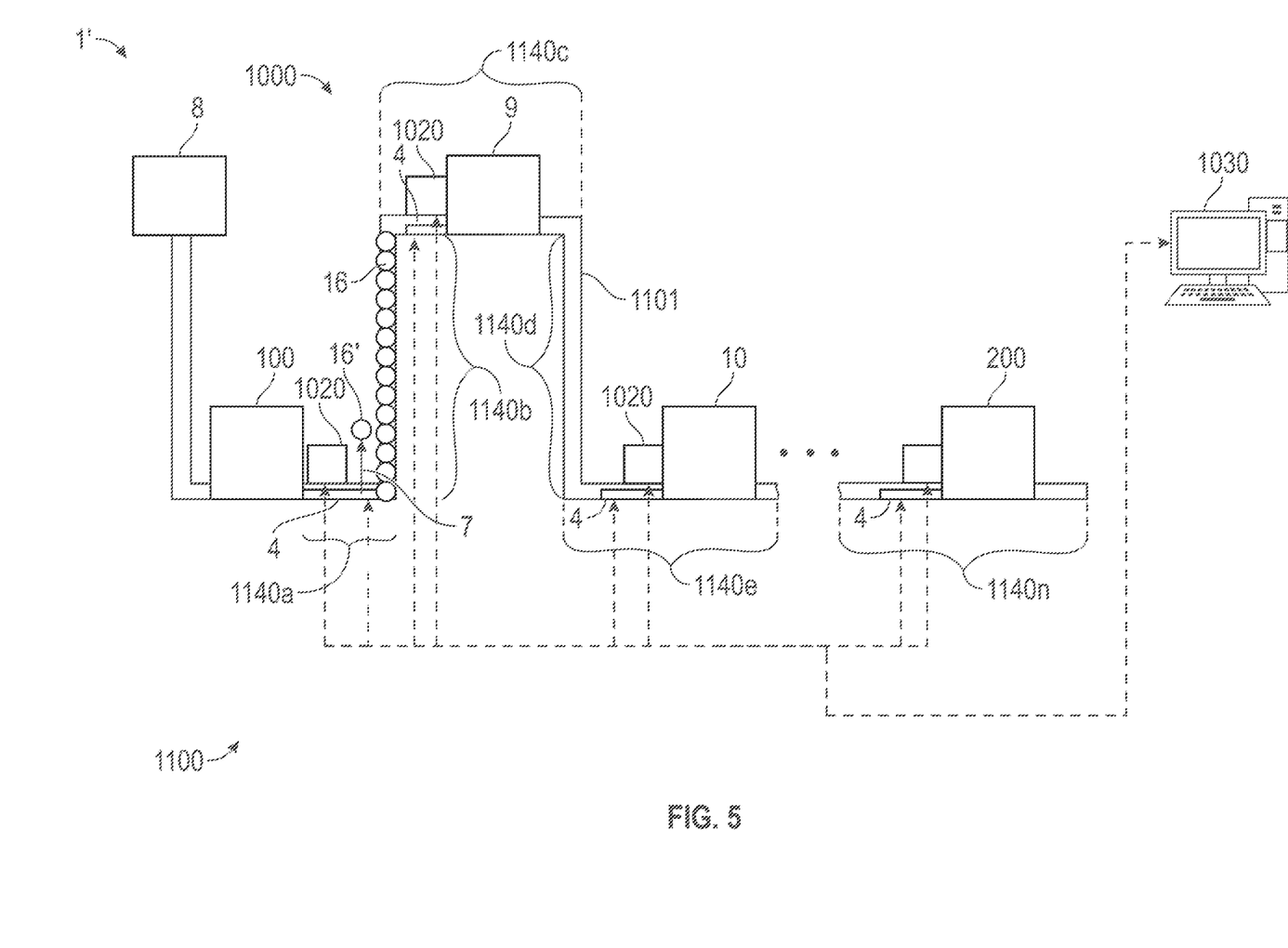
FIG. 5 is an elevation view of an exemplary flow regulating conveyance system for use in a can manufacturing production line in accordance with a non-limiting, example embodiment of the disclosed concept.

FIG. 5 illustrates an exemplary can manufacturing production line 1' using an exemplary flow regulating conveyance system 1000 in accordance with a non-limiting, example embodiment of the disclosed concept. The can manufacturing production line 1' may include similar processing machinery as the can manufacturing production line 1 of FIG. 1, and thus overlapping descriptions of such machinery are omitted for the sake of brevity and conciseness. The can manufacturing production line 1' includes a flow regulating conveyance system 1000 in accordance with an example embodiment of the disclosed concept. FIGS. 6-9 further illustrate an example embodiment of the flow regulating conveyance system 1000.

The flow regulating conveyance system 1000 includes a vision system 1020, a control system 1030 and a flow regulating conveyor 1100. In some examples, the flow regulating conveyance system 1000 may be connected to a conveyance flow actuator (e.g., without limitation, a blower motor or a belt motor), which may be locally or remotely disposed at an air inlet. The vision system 1020 may include, e.g., without limitation, one or more cameras or sensors structured to capture images of the cans 16 on the conveying path 1102. The vision system 1020 is structured to monitor at least pack density and can body diameter of cans 16 on the conveying path 1102. In some examples, the vision system 1020 monitors can volume of the cans 16 on the conveying path 1102. The vision system 1020 inspects at least the pack density and can body diameter on the conveying path 1102 and provides conveyance data to the control system 1030. While FIG. 5 shows the vision system 1020 disposed at an input or output of can manufacturing equipment 9,10,100, 200, it will be understood that this is for illustrative purposes only and the vision system 1020 may be located at other appropriate locations for monitoring pack density and can body diameter of the cans 16 on the conveying path 1102. For example, the vision system 1020 may be disposed in vicinity and/or along the conveying path 1102.

The control system 1030 may be, for example and without limitation, a microprocessor, a microcontroller, or some other suitable processing device or circuitry. It may include memory, which can be any of one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory. The control system 1030 may be communicatively connected to the flow regulating conveyor 1100, the vision system 1020, the conveyance flow actuator and/or an MES (manufacturing execution system, not shown) in a wired or wireless connection. The control system 1030 is structured to receive the conveyance data from the vision system 1020, analyze the conveyance data, and control conveyance flow and track width of the flow regulating conveyor 1100 based on the conveyance data. The control system 1030 then calculates an optimal speed and conveyor track width and adjusts the instant speed and conveyor track width based on the calculation to control the conveyance pressure to a specific conveyance pressure.

The flow regulating conveyor 1100 includes a platform 1101, two track rails 1141a,b, an actuation mechanism and an underlayer 1111. The platform 1101 extends along the conveying path 1102 and has a width in a transverse direction 1103 orthogonal to the conveying path 1102 in a horizontal plane. The platform 1101 has a conveyor surface 1104 including a plurality of air ports 1105 structured to eject air which moves the cans 16 along the conveying path 1102. Optionally, the flow regulating conveyor 1100 may include sidewalls 1120a,b each extending vertically upwardly from respective side edges of the platform 1101 and have a height substantially equal to or greater than the height of the cans 16. Optionally, a top cover 1109 may be attached to the sidewalls 1120a,b so as to prevent accidental displacements of the cans 16 from the flow regulating conveyor 1100. While FIGS. 6-9 illustrate the platform 1101 without a conveyor belt, it will be understood that the flow regulating conveyor 1100 may include a conveyor belt without departing from the scope of the disclosed concept.

The track rails 1141a,b are transversely-spaced-apart and extend along the conveying path 1102 to form a conveying track 1107 therebetween. The track rails 1141a,b are structured to maintain the cans 16 on the conveying track 1107 as the cans 16 move along the conveying path 1102. The conveying track 1107 has a width 1110 adjustable by moving the track rails 1141a,b inwardly or outwardly in the transverse direction 1103. In some examples, the track rails 1141a,b may include a plurality of track sections 1140a-n, where n is an integer, and the flow regulating conveyor 1100 may include rail posts 1142a,b disposed adjacent to the track rails 1141a,b.

The actuation mechanism is coupled to the track rails 1141a,b and structured to adjust the track rails 1141a,b in the transverse direction 1103 orthogonal to the conveying path 1102 in the horizontal plane. The actuation mechanism may be disposed within a conveyance housing 1130. The actuation mechanism may be any actuation mechanism appropriate for adjusting the width 1110 of the conveying track 1107. For example, if precise adjustment of the width 1110 of the conveying track 1107, the actuation mechanism may include a motor 1144, a rail shaft 1145, a gear box 1146 and a lead screw 1147 as shown in FIGS. 6-9. The motor 1144 is communicatively coupled to the control system 1030, which controls the motor 1144 based on the conveyance data or a user input. Upon being turned on, the motor 1144 rotates and turns gears (not shown) in the gear box 1146. The lead screw 1147 is connected to the gear box 1146 and converts the rotary motion of the gears into linear motion. The rail shaft 1145 then moves linearly (inwardly or outwardly) in the transverse direction 1103 and causes the track rails 1141a,b to move transversely inwardly or outwardly. In some examples in which a coarse resolution, not precise adjustment, is needed, the actuation mechanism may be, e.g., without limitation, a scissor jack. A scissor jack may include a screw, extending arms, a holding bracket and a foot and may be fixedly or removably connected to a portion of side surface of respective track rail 1141a,b via the holding bracket and a portion of respective sidewall 1120a,b at the foot. Upon actuation of the screw by a motor connected to the control system 1030 or manually, the scissor jack extends or contracts in the transverse direction and move the respective track rail 1141a,b inwardly or outwardly, thereby adjusting the width 1110 of the conveying track 1107.

Figure 6:
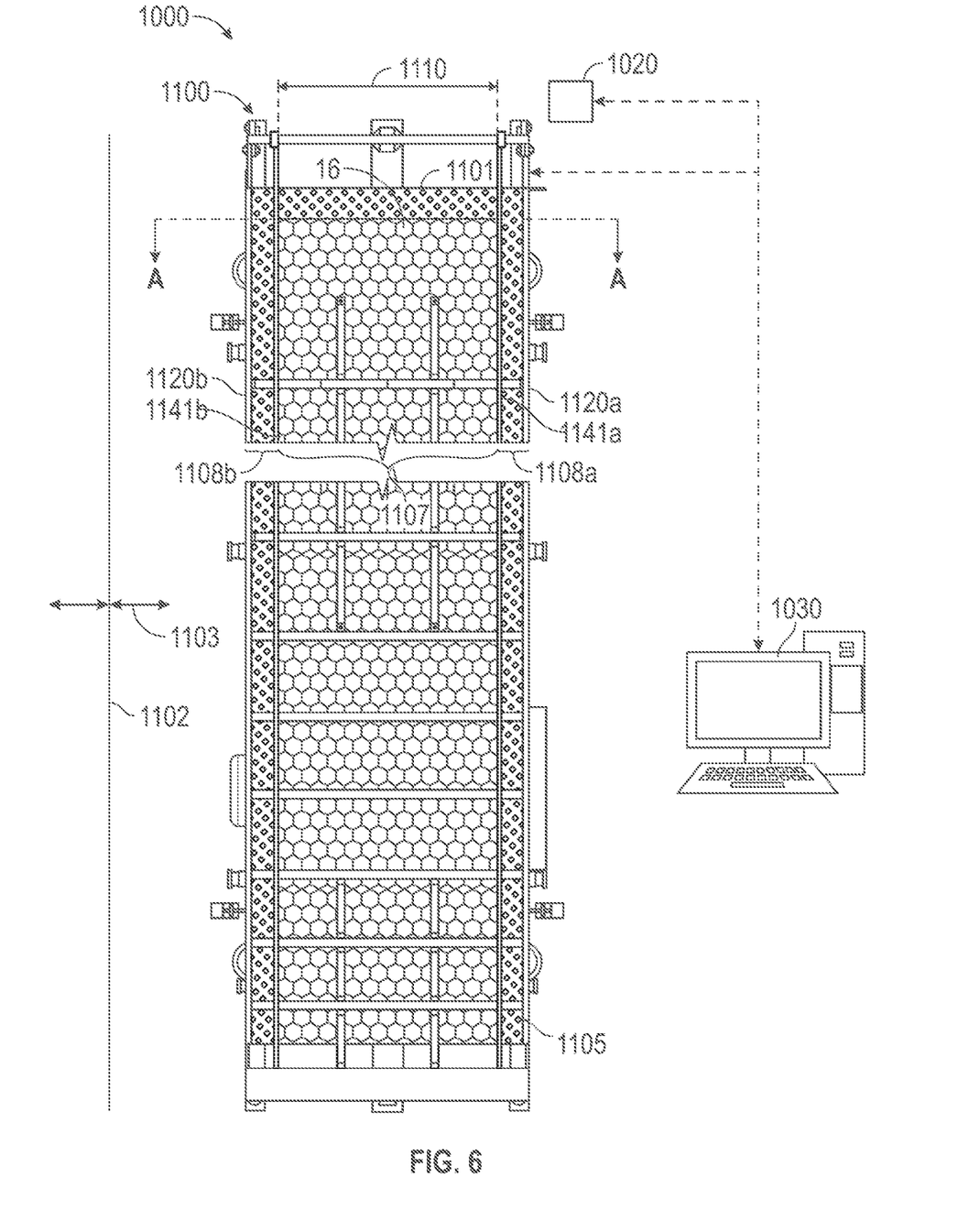
FIG. 6 is a plan view of the flow regulating conveyance system of FIG. 5 adjusted to have a wide conveying track in accordance with a non-limiting, example embodiment of the disclosed concept.
Figure 7:
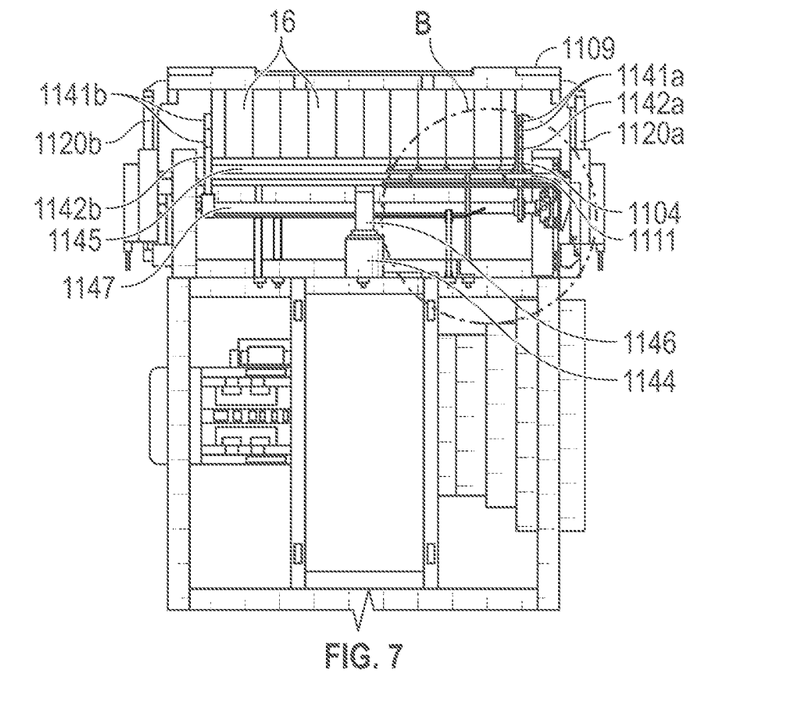
FIG. 7 is a cross-sectional view of the flow regulating conveyance system of FIG. 6 cut through line A-A in accordance with a non-limiting, example embodiment of the disclosed concept.
Figure 7A:
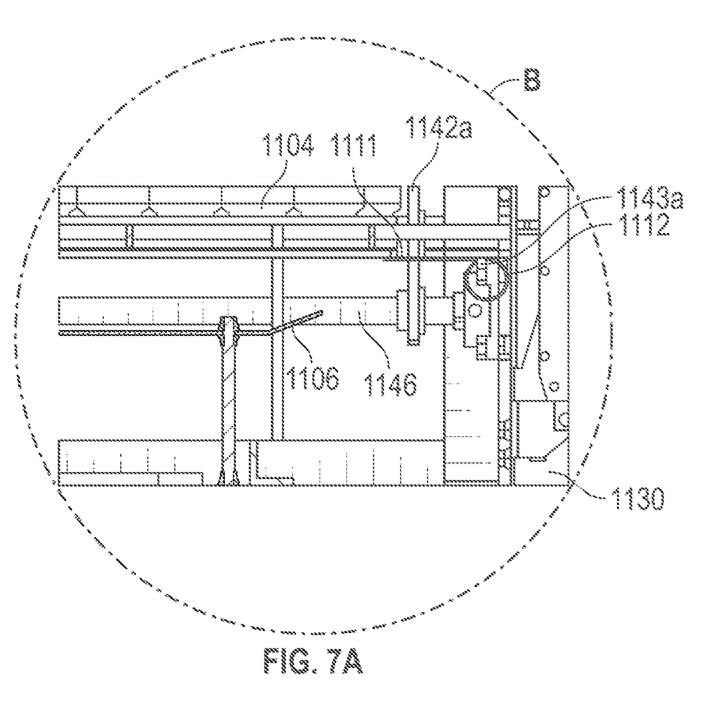
FIG. 7A is an enlarged view of area B of FIG. 7 in accordance with a non-limiting, example embodiment of the disclosed concept.
Figure 8:
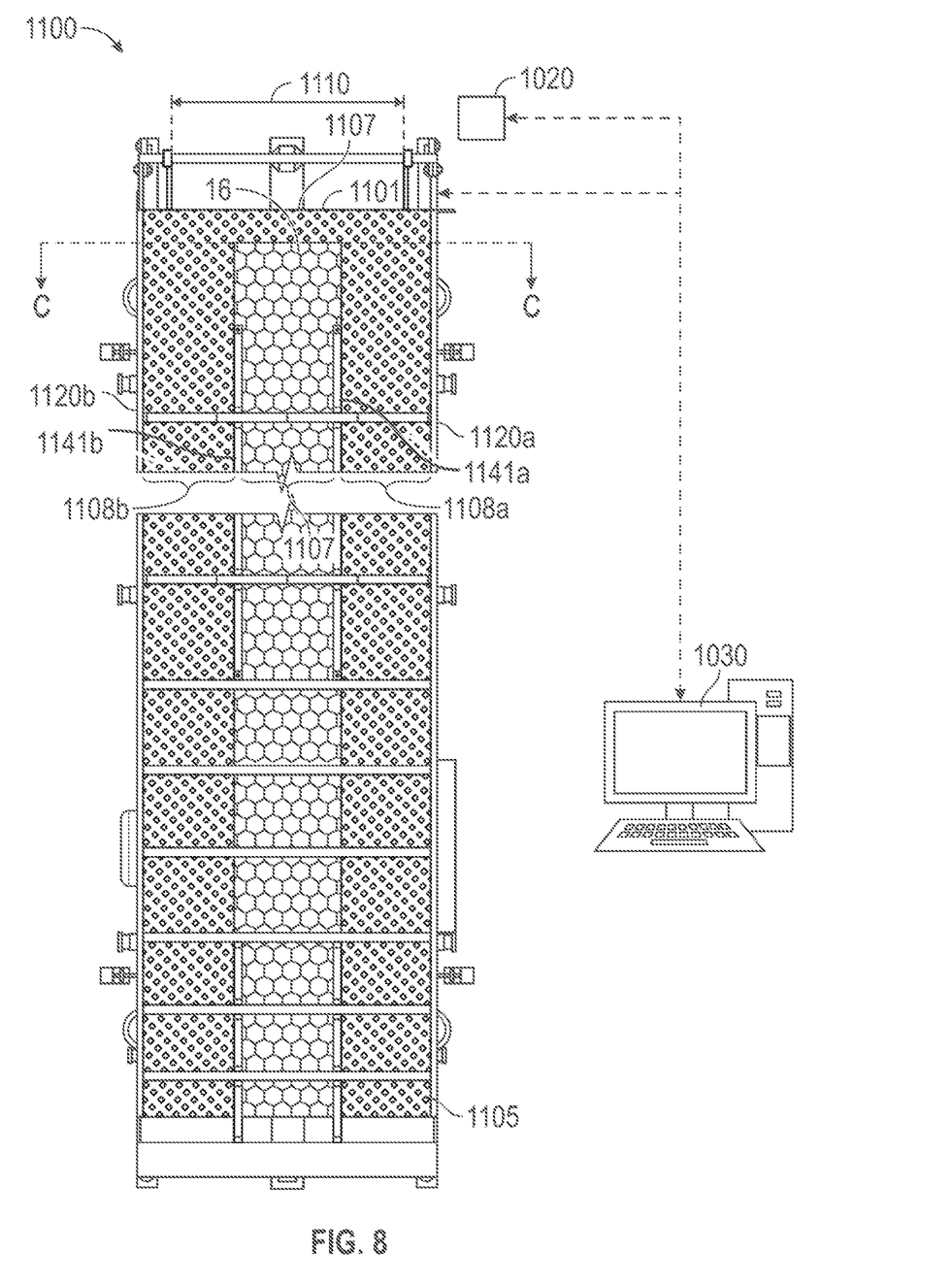
FIG. 8 is a plan view of the flow regulating conveyance system of FIG. 5 adjusted to have a narrow conveying track in accordance with a non-limiting, example embodiment of the disclosed concept.
Figure 9:
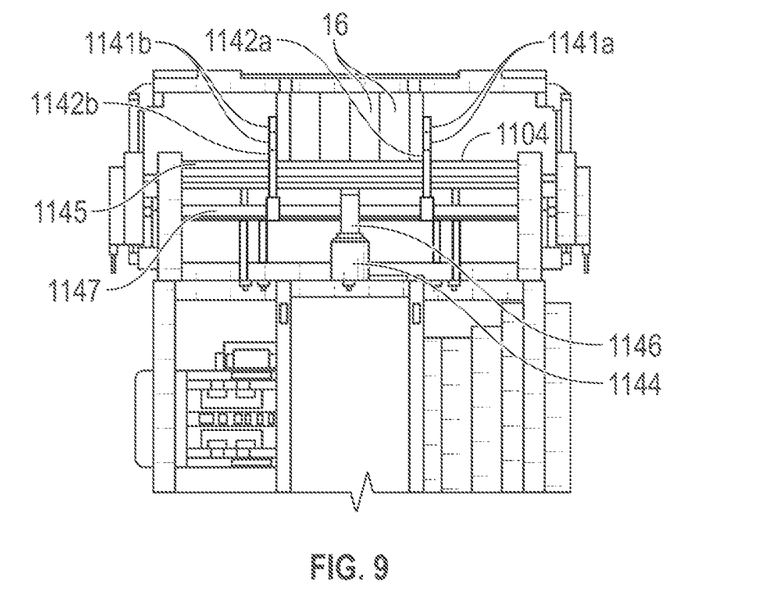
FIG. 9 is a cross-sectional view of the flow regulating conveyance system of FIG. 8 cut through line C-C in accordance with a non-limiting, example embodiment of the disclosed concept.

The underlayer 1111 is disposed below the conveyance surface 1104 and attached to respective track rail 1141a,b at a side edge thereof. The underlayer 1111 is structured to block air ports 1105 disposed outside of the conveying track 1107. That is, as the track rails 1141a,b move transversely inwardly or outwardly in unison with the underlayer 1111, the underlayer 1111 in turn blocks the air ports 1105 disposed outside of the conveying track 1107. For example, the underlayer 1111 blocks air ports in a non-conveying portion 1108a,b of the conveying path 1102. The underlayer 1111 may be, e.g., without limitation, a coil sheet. As shown in FIG. 7A, a roll 1112 of the coil sheet may be disposed within the conveyance housing 1130 and mechanically connected to a track rail anchor 1143a of respective track rail 1141a. Thus, when the width 1110 of the conveying track 1107 is increased or decreased, the underlayer 1111 retracts to the roll 1112 or is released further from the roll 1112. FIGS. 6-7A show the width 1110 of the conveying track 1107 in a wide configuration and FIGS. 8-9 show the width 1110 of the conveying track 1107 in a narrow configuration. While FIG. 7A shows an underlayer 1111 connected to the track rail 1141a only, it will be understood that similar underlayer mechanism may be also applicable to the track rail 1141b. That is, the track rail 1141b may also be connected to respective underlayer (not shown) such that the respective underlayer is released from or retracts to a roll (not shown) connected to an anchor of the track trail 1141b and cover the non-conveying portion 1108b as the track rail 1141b moves transversely inwardly or outwardly in unison with corresponding underlayer in a similar manner.

In operation, as the cans 16 are being conveyed along the conveying path 1102 from one or more upstream can manufacturing machines (e.g., without limitation, one or more bodymakers 100 and/or trimmers 9) to a downstream can manufacturing machine (e.g., without limitation, a can decorator 10), the vision system 1020 monitors at least the pack density and the can body diameter of the cans 16 on the conveying path. In some examples, can volume of the cans 16 being conveyed on the conveying path is also monitored. That is, the vision system 1020 inspects, e.g., without limitation, the pack density and the can body diameter of the cans 16 on the conveying path and transmits conveyance data to the control system 1030. The conveyance data include, e.g., without limitation, the pack density, the can body diameter, the can volume, instant speed of the flow regulating conveyor 1100, and/or a number of machines running in the upstream application. Upon receiving the conveyance data, the control system 1030 is structured to calculate an optimal width of the conveying track 1107 and optimal speed of conveyance flow based on the conveyance data in order to control to a specific conveyance pressure. The "optimal width of the conveying track" means a track width that moves the instant number of cans 16 along the conveying path 1102 without jamming and/or yielding a number of damaged cans 16' during conveyance within an acceptable threshold. The "optimal speed of the conveyance flow" means speed of the conveyance flow within the conveying track 1107 using only a quantity of the air and/or energy sufficient to move the cans 16 along the conveying path 1102 without jamming and/or yielding a number of damaged cans 16' during conveyance within an acceptable threshold. Based on the calculated optimal width 1110 of the conveying track 1107 and the optimal speed of the conveyance flow, the control system 1030 is further structured to adjust the width 1110 of the conveying track 1107 and the speed of the conveyance flow. That is, the control system 1030 causes the actuation mechanism to adjust the width 1110 by moving the track rails 1141a,b inwardly or outwardly in the transverse direction 1103. Also, the control system 1130 adjusts the speed of the conveyance flow by increasing or decreasing speed of the conveyance flow actuator (e.g., without limitation, the blower motor, the belt motor) and a number of the air ports 1105 being blocked by the underlayer 1111.

For example, the conveyance data may indicate that the can diameter of the cans 16 being conveyed has decreased due to, e.g., a size change over from a large diameter can to a small diameter can, track rails would likely be adjusted inwardly or conveyor speed would be reduced. The conveyance data may also indicate that the pack density in the conveying path 1102 has decreased due to, e.g., one or more upstream can manufacturing machines having had stopped operating or been removed. In such cases, the control system 1030 then calculates an optimal width of the conveying track 1107 and optimal speed for the conveyance flow for moving the cans 16 along the conveying path 1102. The control system 1030 then is further structured to adjust the speed of the conveyance flow by decreasing speed of the conveyance flow actuator and increasing the number of air ports blocked by the underlayer 1111. That is, the control system 1030 transmits a signal to the actuation mechanism of the track rails 1141a,b and causes the actuation mechanism to move the track rails 1141a,b inwardly towards each other, thereby narrowing the width 1110 of the conveying track 1107. Simultaneously, the control system 1030 transmits a signal to a conveyance flow actuator (e.g., the blower motor) 5 to decrease its speed based on the optimal speed. Further, since the underlayer 1111 is attached to respective track rail 1141a,b at side edge thereof, the track rails 1141a,b move inwardly in the transverse direction 1103 in unison with the underlayer 1111. As the underlayer 1111 moves inwardly in the transverse direction 1103, the underlayer 1111 blocks an increased number of air ports 1105 including the air ports 1105 that are disposed currently outside of the conveying track 1107 but were previously not blocked by the underlayer 1111. Thus, the decreased speed of the conveyance flow actuator and the increased number of the blocked air ports 1105 together reduce the speed of the conveyance flow.

Conversely, the conveyance data indicate that the can body diameter of the cans 16 being conveyed has increased due to, e.g., without limitation, a size change over from a small diameter can to a large diameter can. The conveyance data may also indicate that the pack density of cans 16 on the conveying path 1102 has increased due to, e.g., one or more upstream can manufacturing machines having begun to operate or been added. In such cases, the control system 1030 then calculates an optimal width of the conveying track 1107 and an optimal speed for the conveyance flow for moving the increased number of cans 16 along the conveying path 1102. The control system 1030 then is further structured to adjust the width of the conveying track 1107 by moving the track rails 1141a,b outwardly and the speed of the conveyance flow by increasing speed of the conveyance flow actuator and decreasing a number of air ports 1104 blocked by the underlayer 1111. That is, the control system 1030 transmits a signal to the actuation mechanism of the track rails 1141a,b and causes the actuation mechanism to move the track rails 1141a,b outwardly, thereby widening the width 1110 of the conveying track 1107. Simultaneously, the control system 1030 transmits a signal to a conveyance flow actuator to increase its speed based on the optimal speed. Further, since the underlayer 1111 is attached to respective track rail 1141a,b at side edge thereof, the track rails 1141a,b move outwardly in the transverse direction 1103 in unison with the underlayer 1111. As the underlayer 1111 moves outwardly in the transverse direction 1103, the underlayer 1111 now blocks a decreased number of air ports 1105 that are currently disposed outside of the conveying track 1107. Thus, the increased speed of the conveyance flow actuator and the decreased number of the blocked air ports 1105 together increase the speed of the conveyance flow.

By allowing adjustment of the track rails and a number of blocked air ports based on a determination of the optimal track width and the optimal speed of the conveyance flow, the flow regulating control system 1000 prevents jamming or can damages occurring due to, e.g., without limitation, excessive or inadequate can body diameter and/or pack density. Further, by tailoring the track width and the conveyance flow speed to accommodate the instant can production volume and/or number of operating upstream can manufacturing machines, the flow regulation control system 1000 reduces wasted energy and air consumption. Accordingly, by controlling the width of the conveying track and the speed of the conveyance flow in accordance with fluctuations of machine capacity and production demands, the flow regulating conveyance system 1000 minimizes can damages, conserves energy and air consumption for conveyance, and reduces manufacturing costs typically incurred when conveying cans using the conventional air conveyance system 2000.

Figure 10:
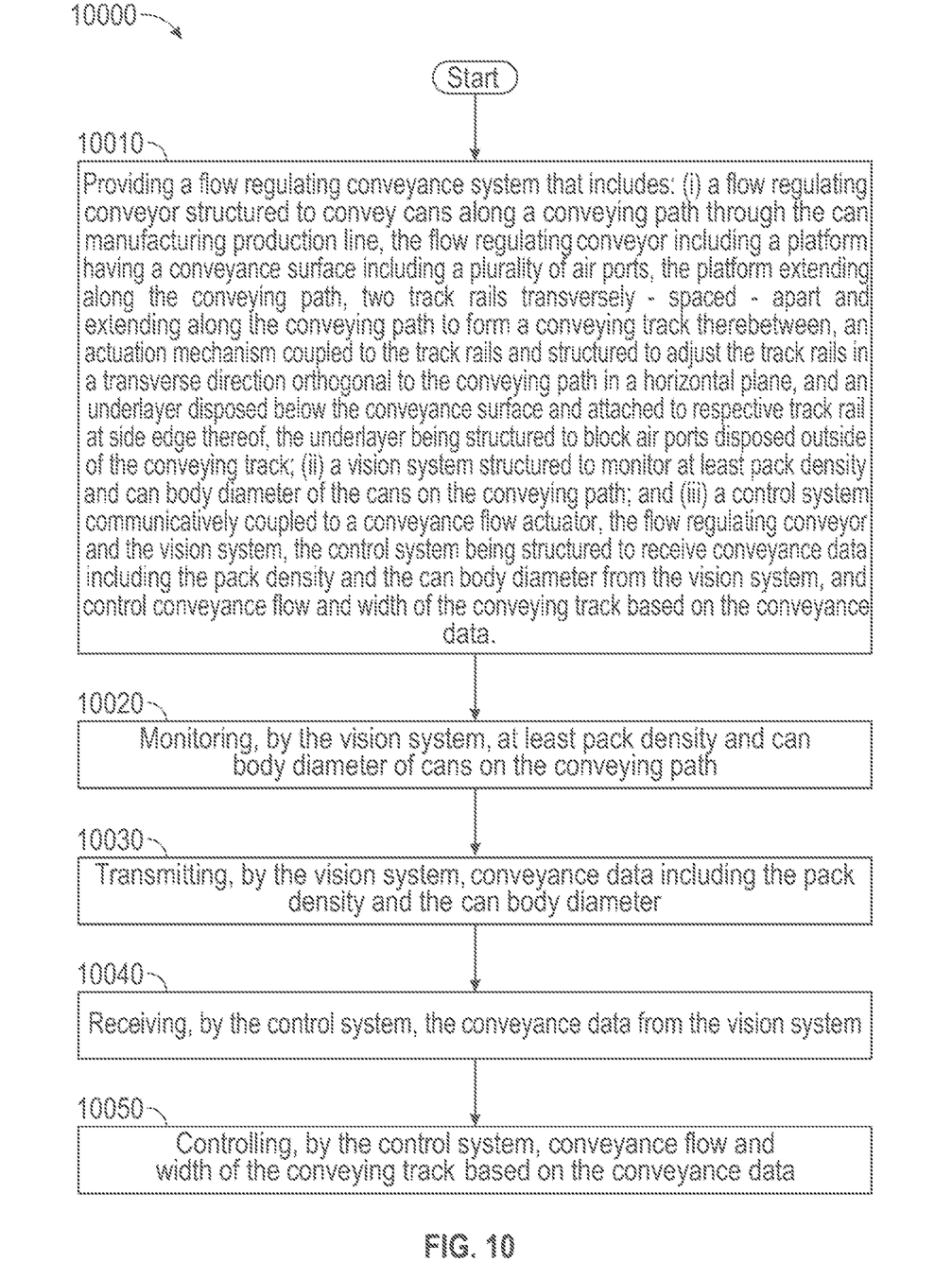
FIG. 10 is a flow chart of a method for regulating flow using the flow regulating conveyance system of FIG. 5 in accordance with a non-limiting, example embodiment of the disclosed concept.

FIG. 10 is a flow chart for a method 10000 of flow regulating in can manufacturing using a flow regulating conveyance system according to a non-limiting, example embodiment of the disclosed concept. The flow regulating conveyance system is similar to the flow regulating system 1000 as described with reference to FIGS. 5-9. The method 1000 may be performed by the flow regulating system 1000 or any components thereof.

At 1010, a flow regulating system is provided. The flow regulating conveyance system includes: (i) a flow regulating conveyor structured to convey cans along a conveying path through the can manufacturing production line, the flow regulating conveyor including a platform having a conveyance surface including a plurality of air ports, the platform extending along the conveying path, two track rails transversely-spaced-apart track rails and extending along the conveying path to form a conveying track therebetween, an actuation mechanism coupled to the track rails and structured to adjust the track rails in a transverse direction orthogonal to the conveying path in a horizontal plane, and an underlayer disposed below the conveyance surface and attached to respective track rail at side edge thereof, the underlayer being structured to block air ports disposed outside of the conveying track; (ii) a vision system structured to monitor at least pack density and can body diameter of the cans on the conveying path; and (iii) a control system communicatively coupled to a conveyance flow actuator, the flow regulating conveyor and the vision system, the control system being structured to receive conveyance data including the pack density and the can body diameter from the vision system, and control conveyance flow and width of the conveying track based on the conveyance data.

At 10020, the vision system monitors at least pack density and can body diameter of the cans on the conveying path.

At 10030, the vision system transmits conveyance data conveyance data including the pack density and the can body diameter.

At 10040, the control system receives the conveyance data from the vision system.

At 10050, the control system controls conveyance flow and width of the conveying track based on the conveyance data.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A flow regulating conveyance system for use in a can manufacturing production line, comprising:
   a flow regulating conveyor structured to convey cans along a conveying path through the can manufacturing production line, flow regulating conveyor including: a platform having a conveyance surface including a plurality of air ports, the platform extending along the conveying path, two track rails transversely-spaced-apart and extending along the conveying path to form a conveying track therebetween, an actuation mechanism coupled to the track rails and structured to adjust the track rails in a transverse direction orthogonal to the conveying path in a horizontal plane, and an underlayer disposed below the conveyance surface and attached to respective track rail at side edge thereof, the underlayer being structured to block air ports disposed outside of the conveying track;
   a vision system structured to monitor at least pack density and can body diameter of cans on the conveying path; and
   a control system communicatively coupled to a conveyance flow actuator, the flow regulating conveyor and the vision system, the control system being structured to receive conveyance data including the pack density and the can body diameter from the vision system, control conveyance flow and width of the conveying track based on the conveyance data.

2. The system of claim 1, wherein the control system is further structured to calculate an optimal speed for the conveyance flow and an optimal width of the conveying track based on the conveyance data.

3. The system of claim 2, wherein the optimal speed indicate that speed of the conveyance flow are to be increased and the optimal width indicates that the width of the conveying track is to be widened.

4. The system of claim 3, wherein the control system is further structured to control the actuation mechanism to adjust the width of the conveying track and wherein the actuation system is structured to move the track rails outwardly in the transverse direction based on the optimal width.

5. The system of claim 3, wherein the control system is further structured to adjust the speed of the conveyance flow by increasing speed of the conveyance flow actuator and decreasing a number of air ports blocked by the underlayer.

6. The system of claim 5, wherein the track rails move outwardly in the transverse direction in unison with the underlayer and as the track rails move outwardly, the underlayer retracts to respective roll attached to a track rail anchor disposed in a conveyance housing including the actuation mechanism such that the underlayer no longer blocks the air ports that are currently disposed within the conveying track and were previously blocked by the underlayer.

7. The system of claim 2, wherein the optimal speed indicate that speed of the conveyance flow is to be decreased and the optimal width indicates that the width of the conveying track is to be narrowed.

8. The system of claim 7, wherein the control system is further structured to control the actuation mechanism to adjust the width of the conveying track and wherein the actuation system is structured to move the track rails inwardly toward each other in the transverse direction based on the optimal width.

9. The system of claim 8, wherein the control system is further structured to adjust the speed of the conveyance flow by decreasing speed of the conveyance flow actuator and increasing a number of air ports blocked by the underlayer.

10. The system of claim 9, wherein the track rails move in the transverse direction in unison with the underlayer and as the track rails move inwardly, the underlayer is released from respective roll attached to respective track rail anchor disposed in a conveyance housing including the actuation mechanism such that the underlayer blocks the air ports that are currently disposed outside of the conveying track and were previously not blocked by the underlayer.

11. The system of claim 1, wherein the underlayer comprise coil sheets.

12. The system of claim 1, wherein the actuation mechanism comprises:
   a gear box including one or more gears,
   a motor connected to the gear box and structured to rotate the one or more gears upon actuation by the control system;
   a lead screw connected to the gear box and structured to convert rotary motion of the one or more gears into linear motion; and
   a rail shaft connected to the lead screw and structured to move linearly in the transverse direction and adjust the track rails inwardly or outwardly in the transverse direction.

13. The system of claim 12, wherein the actuation mechanism is disposed in a conveyance housing disposed below the platform, the conveyance housing including track rail anchors structured to secure the track rails on the platform, each track rail anchor having respective roll of the underlayer attached thereto such that the roll is secured relative to the track rail anchor, the roll being structured to release or retract the underlayer as the track rails move transversely inwardly or outwardly.

14. The system of claim 1, wherein the track rails comprise a plurality of track sections and wherein the flow regulating conveyor further comprises rail posts disposed at ends of each track section and structured to join one or more track sections such that no gaps between or protrusions in the track rails occur at the ends of each track section.

15. The system of claim 1, wherein the actuation mechanism comprises a scissor jack.

16. A flow regulating conveyor structured to convey cans along a conveying path and connected to a vision system and a control system, the flow regulating conveyor comprises:
   a platform having a conveyance surface including a plurality of air ports, the platform extending along the conveying path;
   two track rails transversely-spaced-apart and extending along the conveying path to form a conveying track therebetween;
   an actuation mechanism coupled to the track rails and structured to adjust the track rails in a transverse direction orthogonal to the conveying path in a horizontal plane; and
   an underlayer disposed below the conveyance surface and attached to respective track rail at side edge thereof, the underlayer being structured to block air ports disposed outside of the conveying track, wherein the vision system is structured to monitor at least pack density and can body diameter of cans on the conveying path, and wherein a control system is structured to receive conveyance data including the pack density and the can body diameter from the vision system, control conveyance flow and width of the conveying track based on the conveyance data.

17. A method of conveyance flow regulating in a can manufacturing production line, the method comprising:

providing a flow regulating conveyance system that comprises: (i) a flow regulating conveyor structured to convey cans along a conveying path through the can manufacturing production line, the flow regulating conveyor including a platform having a conveyance surface including a plurality of air ports, the platform extending along the conveying path, two track rails transversely-spaced-apart and extending along the conveying path to form a conveying track therebetween, an actuation mechanism coupled to the track rails and structured to adjust the track rails in a transverse direction orthogonal to the conveying path in a horizontal plane, and an underlayer disposed below the conveyance surface and attached to respective track rail at side edge thereof, the underlayer being structured to block air ports disposed outside of the conveying track; (ii) a vision system structured to monitor at least pack density and can body diameter of cans on the conveying path; and (iii) a control system communicatively coupled to a conveyance flow actuator, the flow regulating conveyor and the vision system, the control system being structured to receive conveyance data including the pack density and the can body diameter from the vision system, and control conveyance flow and width of the conveying track based on the conveyance data;

monitoring, by the vision system, at least pack density and can body diameter of cans on the conveying path;

transmitting, by the vision system, conveyance data including the pack density and the can body diameter;

receiving, by the control system, the conveyance data from the vision system; and controlling, by the control system, conveyance flow and width of the conveying track based on the conveyance data.

18. The method of claim 17, further comprising:

calculating, by the control system, an optimal speed for the conveyance flow and an optimal width of the conveying track based on the conveyance data.

19. The method of claim 18, wherein the optimal speed indicate that speed of the conveyance flow are to be increased and the optimal width indicates that the width of the conveying track is to be widened, the method further comprising:

causing, by the control system, the actuation mechanism to move the track rails outwardly in the transverse direction based on the optimal width and decrease a number of air ports blocked by the underlayer upon moving the track rails outwardly; and causing, by the control system, to increase speed of the conveyance flow actuator.

20. The method of claim 18, wherein the optimal speed indicate that speed of the conveyance flow are to be decreased and the optimal width indicates that the width of the conveying track is to be narrowed, the method further comprising:

causing, by the control system, the actuation mechanism to move the track rails inwardly toward each other in the transverse direction based on the optimal width and increase a number of air ports blocked by the underlayer upon moving the track rails inwardly; and causing, by the control system, to decrease speed of the conveyance flow actuator.

* * * * *